United States Patent
Lo et al.

(10) Patent No.: US 10,128,518 B2
(45) Date of Patent: Nov. 13, 2018

(54) HYDROGEN PRODUCTION SYSTEM AND METHODS OF PRODUCING THE SAME

(71) Applicant: HONEYWELL INTERNATIONAL INC., Morris Plains, NJ (US)

(72) Inventors: Charles Lo, Phoenix, AZ (US); Dacong Weng, Rancho Palos Verdes, CA (US); Bijan F. Hagh, Newport Beach, CA (US); David Loeffelholz, Long Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/488,736

(22) Filed: Apr. 17, 2017

(65) Prior Publication Data
US 2018/0301725 A1    Oct. 18, 2018

(51) Int. Cl.
*C10G 5/06* (2006.01)
*H01M 8/0662* (2016.01)
(Continued)

(52) U.S. Cl.
CPC ......... *H01M 8/0618* (2013.01); *B01J 19/245* (2013.01); *B01J 19/248* (2013.01); *B01J 19/2445* (2013.01); *C01B 3/384* (2013.01); *C01B 3/48* (2013.01); *H01M 8/0675* (2013.01); *B01J 2219/0002* (2013.01);
(Continued)

(58) Field of Classification Search
CPC .......... Y02P 20/128; C01B 2203/1082; C01B 2203/1247; C01B 2203/1294; C01B 2203/148; C01B 2203/066; C01B 2203/0822; C01B 3/384; C01B 2203/0233; H01M 8/04022; H01M 8/0618; H01M 2008/1293; B01J 2208/00504; B01J 12/007; B01J 2219/00117; B01J 8/067;
(Continued)

(56) References Cited

U.S. PATENT DOCUMENTS 3,172,739 A    3/1965 Reagan et al.
3,453,087 A    7/1969 Herp et al.
(Continued)

FOREIGN PATENT DOCUMENTS

EP    0423905 A2    4/1991

OTHER PUBLICATIONS

Extended EP Search Report for Application No. 18167130.6-1106 dated Jul. 18, 2018.

*Primary Examiner* — Amber R Orlando
*Assistant Examiner* — Syed T Iqbal
(74) *Attorney, Agent, or Firm* — Lorenz & Kopf, LLP

(57) ABSTRACT

Hydrogen production systems and methods of producing the same are provided. In an exemplary embodiment, a hydrogen production system comprises a reformer reactor that comprises a reformer reactor wall. A plurality of reformer tubes are interconnected to define a reformer lattice that has a reformer inner flow path and a reformer outer flow path. The plurality of reformer tubes are within the reformer reactor and connected to the reformer reactor wall at a plurality of discrete locations. The reformer lattice defines a combustor side that is one of the reformer inner or outer flow paths, and a reformer side that is the other of the reformer inner or outer flow paths. A reformer catalyst is positioned within the reformer side.

20 Claims, 5 Drawing Sheets

(51) Int. Cl.
  *H01M 8/0612* (2016.01)
  *C01B 3/38* (2006.01)
  *C01B 3/48* (2006.01)
  *B01J 19/24* (2006.01)

(52) U.S. Cl.
  CPC .............. *B01J 2219/2401* (2013.01); *C01B 2203/0233* (2013.01); *C01B 2203/0283* (2013.01); *C01B 2203/066* (2013.01); *C01B 2203/0811* (2013.01); *C01B 2203/0833* (2013.01); *C01B 2203/1235* (2013.01)

(58) Field of Classification Search
  CPC .... B01J 2208/00309; B01J 2219/00099; B01J 2219/00157; B01J 2208/00522
  See application file for complete search history.

(56) References Cited

U.S. PATENT DOCUMENTS

| | | |
|---|---|---|
| 3,667,429 A | 6/1972 | Cross |
| 3,980,440 A * | 9/1976 | Morse ............... B01J 8/062 422/202 |
| 4,547,356 A | 10/1985 | Papineau |
| 6,481,207 B2 | 11/2002 | Miura et al. |
| 6,641,625 B1 | 11/2003 | Clawson et al. |
| 6,835,482 B2 | 12/2004 | Kawamoto et al. |
| 6,998,096 B2 | 2/2006 | Ishikawa |
| 7,037,472 B2 | 5/2006 | Komiya et al. |
| 7,628,963 B2 | 12/2009 | Woo et al. |
| 7,799,449 B2 | 9/2010 | Park et al. |
| 8,696,773 B2 | 4/2014 | Fuju et al. |
| 8,702,823 B2 | 4/2014 | Kani et al. |
| 9,350,037 B2 | 5/2016 | Steinwandel et al. |
| 2002/0172630 A1 | 11/2002 | Ahmed et al. |
| 2004/0126288 A1 | 7/2004 | Fuju et al. |
| 2007/0104983 A1 | 5/2007 | Wakita et al. |
| 2007/0166580 A1 | 7/2007 | Kim et al. |
| 2008/0090112 A1 | 4/2008 | Lee et al. |
| 2009/0042071 A1 * | 2/2009 | Fischer ............... B01J 8/067 429/415 |
| 2010/0239925 A1 | 9/2010 | Ohkawara et al. |
| 2011/0123880 A1 | 5/2011 | Mukai et al. |
| 2012/0114537 A1 | 5/2012 | Son |
| 2012/0231359 A1 | 9/2012 | Fuju et al. |
| 2014/0014493 A1 | 1/2014 | Ryan |
| 2015/0303502 A1 | 10/2015 | Fujioka et al. |
| 2016/0202003 A1 | 7/2016 | Gerstler et al. |

\* cited by examiner

HYDROGEN PRODUCTION SYSTEM AND METHODS OF PRODUCING THE SAME

TECHNICAL FIELD

The present disclosure generally relates to hydrogen production systems and methods of producing the same, and more particularly relates to light weight hydrogen production systems and methods of producing the same.

BACKGROUND

Fuel cells use hydrogen and oxygen to produce electricity, and many fuel cells that produce electricity are more efficient than internal combustion engines. Air is typically used for the oxygen supply, but hydrogen is not readily available at many locations. Hydrogen can be produced from liquid hydrocarbon fuels in a hydrogen production system, which is sometimes referred to as a fuel reformer, and liquid fuels have several advantages over hydrogen. For example, liquid fuels do not require high pressure storage tanks like hydrogen gas, liquid fuels typically have a higher energy density than hydrogen, liquid fuels are denser than most compressed gases so less storage space is needed, and liquid fuels are more readily available as mentioned above.

The fuel reforming reaction combines a liquid hydrocarbon fuel with oxygen to produce hydrogen gas, carbon monoxide, and may produce some carbon dioxide in a reformate stream, where the oxygen may be provided in air, steam or other sources. The steam reforming reaction (sometimes referred to herein as the "reforming reaction") is endothermic, but the fuel used for the reforming reaction can also be combusted in a combustion reactor to provide the heat needed to drive the reforming reaction. The reformate stream may be combined with more superheated steam and then subjected to a water gas shift reaction to produce carbon dioxide and hydrogen from carbon monoxide and water. In some embodiments the fuel reforming reaction takes place at about 700 to about 1,100 degrees centigrade (° C.) and about 3 to about 25 atmospheres pressure, and the water gas shift reaction takes place at about 200 to about 450° C. and about 1 to about 20 atmospheres pressure. After the water gas shift reaction, the hydrogen may be cooled down to remove water by condensation before use in a fuel cell. The widely varying temperatures and pressures briefly summarized above can be maintained with heat exchangers and pressure control mechanisms.

In some embodiments, the size and weight of the hydrogen production system and fuel cell are limited. For example, size and weight are important parameters for components in aircraft. The high pressures involved in some of the reactions typically require a vessel with walls that are thick enough to withstand the temperatures and pressures involved. However, thicker walls increase the size and weight of a reformer and limit aerospace applications.

Accordingly, it is desirable to provide a hydrogen production system with reduced weight compared to typical hydrogen production systems with thick, heavy, high pressure containment walls. In addition, it is desirable to produce a hydrogen production system where the various components are combined so they occupy less space than a plurality of vessels. Further in addition, it is desirable to provide a hydrogen production system with transition and interconnect ducting, and with high thermal integration that may improve efficiency. Furthermore, other desirable features and characteristics of the present embodiment will become apparent from the subsequent detailed description and the appended claims, taken in conjunction with the accompanying drawings and this background of the invention.

BRIEF SUMMARY

Hydrogen production systems and methods of producing the same are provided. In an exemplary embodiment, a hydrogen production system comprises a reformer reactor that comprises a reformer reactor wall. A plurality of reformer tubes are interconnected to define a reformer lattice that has a reformer inner flow path and a reformer outer flow path. The plurality of reformer tubes are within the reformer reactor and connected to the reformer reactor wall at a plurality of discrete locations. The reformer lattice defines a combustor side that is one of the reformer inner or outer flow paths, and a reformer side that is the other of the reformer inner or outer flow paths. A reformer catalyst is positioned within the reformer side.

A hydrogen production system is provided in another embodiment. The hydrogen production system includes a water gas shift reactor that comprises a shift reactor wall. A plurality of shift tubes are interconnected to define a shift inner flow path and a shift outer flow path, where the plurality of shift tubes are within the water gas shift reactor. The plurality of shift tubes are connected to the shift reactor wall at a shift plurality of discrete locations. A first header and a second header are configured to supply a reformate to a shift reactor side of the water gas shift reactor, where the shift reactor side is one of the shift inner and outer flow paths. The first and second headers are further configured to supply water to a shift heat exchanger side of the water gas shift reactor, where the shift heat exchanger side is the opposite one of the shift inner and outer flow paths as that of the shift reactor side.

A method of producing hydrogen gas is provided in yet another embodiment. Hydrogen gas is produced from a liquid fuel in a reformer side of a reformer reactor. The reformer side is defined as one of a reformer inner flow path or a reformer outer flow path that are defined by a plurality of reformer tubes within the reformer reactor. The plurality of reformer tubes are interconnected to form a lattice and are connected to a reformer reactor wall at a plurality of discrete locations. The fuel is combusted in a combustor side of the reformer reactor, where the combustor side is the opposite side of the reformer inner and outer flow paths as that of the reformer side.

BRIEF DESCRIPTION OF THE DRAWINGS

The present embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses of the invention. Furthermore, there is no intention to be bound by any expressed or implied theory presented in the preceding technical field, background, brief summary, or the following detailed description.

A vessel wall is connected to an internal three dimensional lattice in a plurality of discrete locations such that the internal lattice supports the vessel wall. The vessel wall is capable of withstanding greater pressures and stresses than an unsupported vessel wall of the same thickness because it is supported at a plurality of discrete locations. Thinner vessel walls can be used for a set pressure rating due to the support from the lattice, so the weight of the vessel can be reduced. The lattice may include a plurality of tubes such that the internal portion of the vessel is divided into two compartments; one inside the tubes and the other outside the tubes. The different portions of the vessel inside the tubes and outside the tubes can be used for separate reactions so the number of vessels for a given process can be reduced. The vessel with a supporting lattice may be used in a hydrogen production system, as described below, but other uses are also possible for the reactor design with an internal lattice. For example, the reactor design with an internal lattice may be useful for autothermal reformation reactions, heat exchanger, and many other uses.

Figure 1:
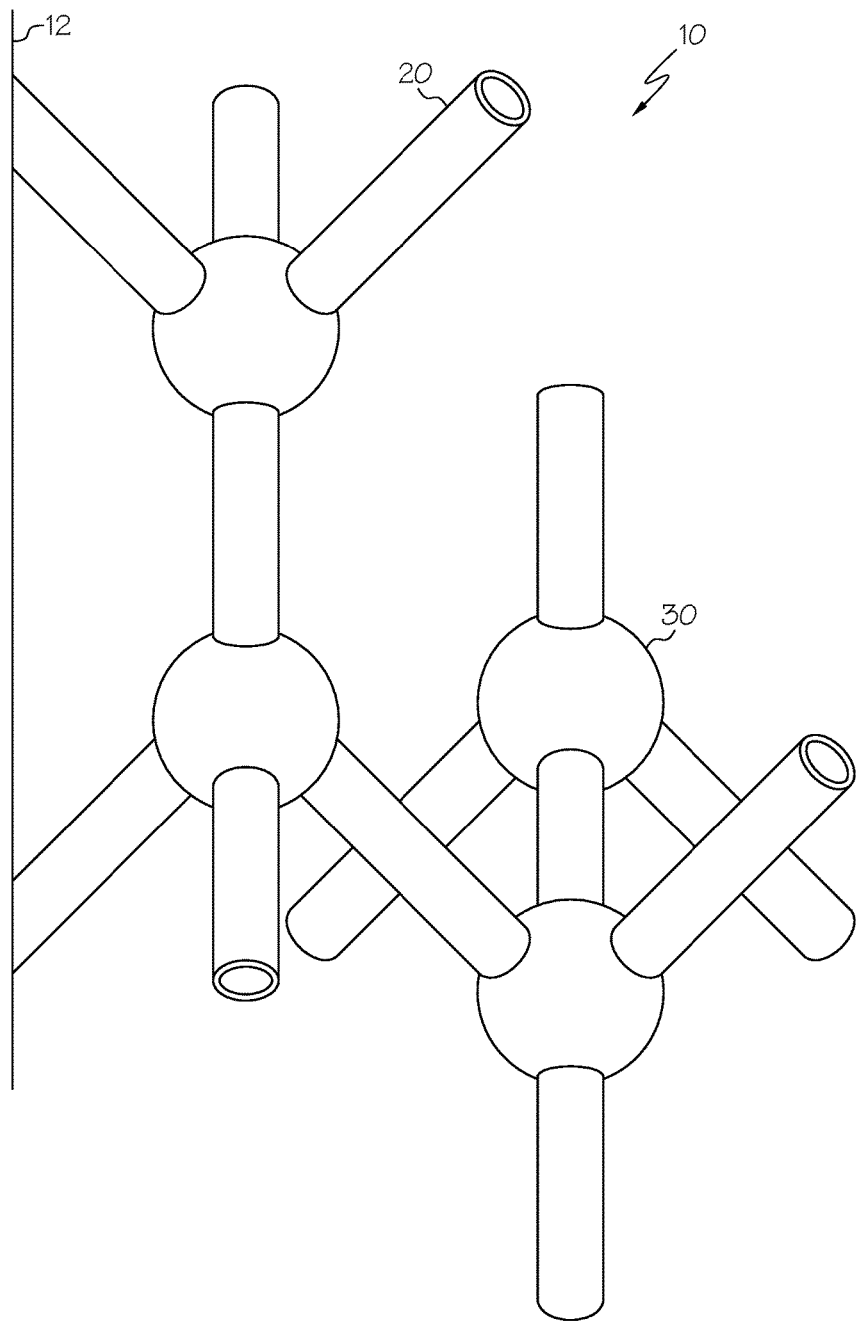
FIG. 1 is a portion of a lattice formed within a chamber.
Figure 2:
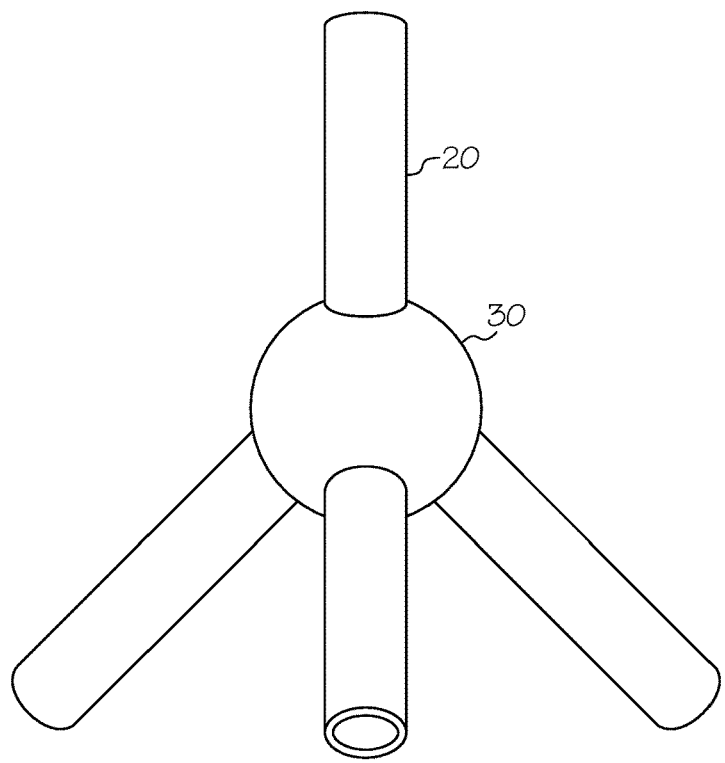
FIG. 2 is a diagram depicting one portion of the lattice illustrated in FIG. 1.

Reference is made to an exemplary embodiment illustrated in FIG. 1. A three dimensional lattice 10 is formed from a plurality of tubes 20 and a plurality of hubs 30. In the illustrated embodiment, each hub 30 is directly connected to four different tubes 20, and each tube 20 is directly connected to two different hubs 30. A "tube," as used herein, is an enclosed passageway between two distinct locations, and a "hub," as used herein, is an enclosed area in direct fluid communication with a plurality of tubes 20. In an exemplary embodiment, the hub 30 is directly connected to at least three of the plurality of tubes 20, where the hubs 30 and the tubs 20 can be configured in a variety of embodiments. In the illustrated embodiment, the plurality of tubes 20 and plurality of hubs 30 are configured in a repeating pattern to form the lattice 10. A "lattice," as used herein, is a three dimensional arrangement of components within a space that forms a continuous connection between any two components within the lattice, where the components do not fill the entire space. In an exemplary embodiment the lattice 10 is formed from a repeating pattern, such as a diamond pattern. FIG. 2 illustrates five hubs 30 in a diamond shape, where the spheres represent hubs 30 and the lines represent tubes 20, with continuing reference to FIG. 1. In the diamond pattern, there are four tubes 20 directly connected to each hub 30, and each tube 20 directly connected to an individual hub 30 is about 110 degrees (such as from about 100 to about 120 degrees) from every other tube 20 directly connected to that hub 30, but alternate patterns with varying angles may also be used. This diamond pattern can be repeated to fill a space and form a lattice 10. This diamond pattern is the same pattern formed by carbon atoms and covalent bonds in a diamond. The lattice 10 is connected to a vessel wall 12 at a plurality of discrete locations, and the vessel wall 12 may be connected to the lattice 10 at every location where the repeating pattern intersects the vessel wall 12.

Figure 3:
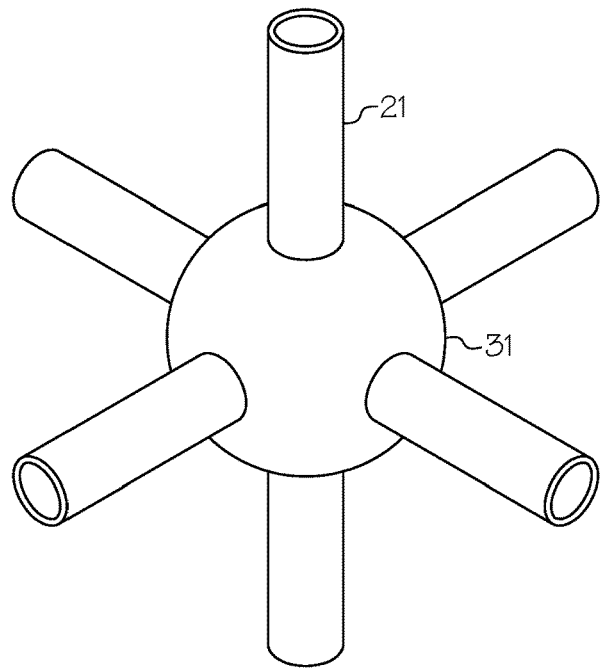
FIG. 3 is a diagram depicting one portion of another embodiment of the lattice.
Figure 4:
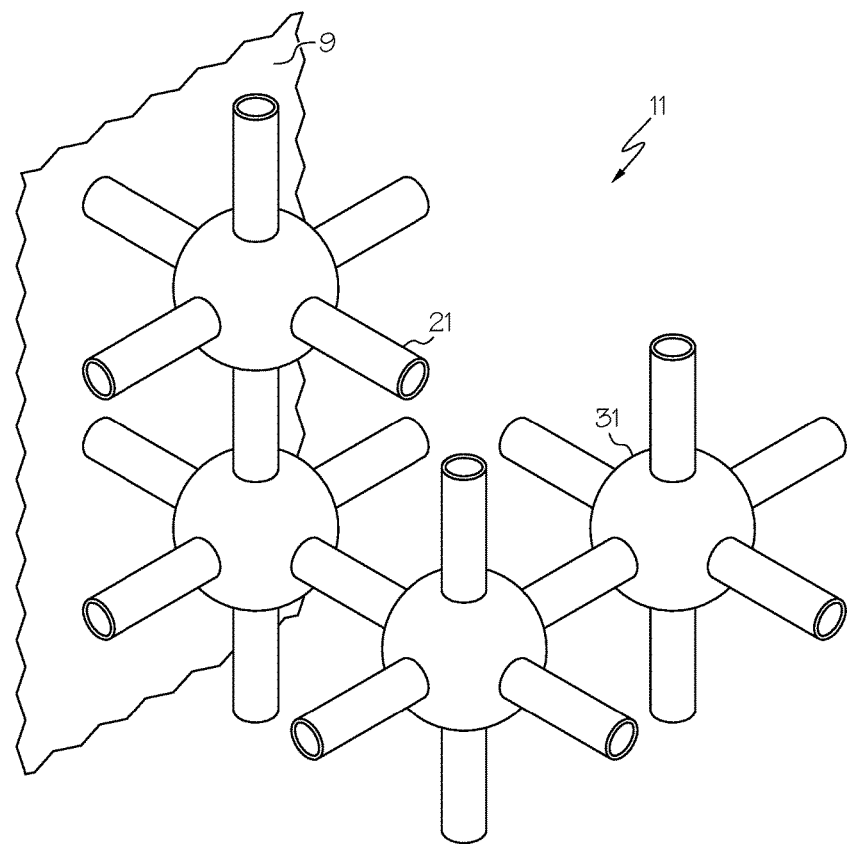
FIG. 4 is a side sectional view of another embodiment of the lattice within a chamber.

Referring to FIGS. 3 and 4, the lattice 11 may be formed from a plurality of tubes 21 and hubs 31 with a repeating pattern other than the diamond pattern described above. For example, the repeating pattern may have six tubes 21 intersecting a hub 31, where every tube 21 intersecting the hub 31 is either 90 degrees or 180 degrees from a reference tube 21 that intersects the hub 31, as illustrated best in FIG. 3. FIG. 4 is a cross sectional view sectioned on a plane in front of a plurality of hubs 31. Fluid flowing vertically in the embodiment illustrated in FIG. 4 could flow in essentially a straight line, with some agitation within the hubs 31. Other repeating patterns can be used to form the lattice 11 in alternate embodiments, and in yet other embodiments more than one repeating pattern may be used. For example, a major pattern and a minor pattern could be combined to form the lattice 11. In yet other embodiments, the lattice 11 may be formed from a variety of shapes such that no recognizable repeating pattern is used. However, in many embodiments the lattice 11 includes a plurality of tubes 21 and a plurality of hubs 31, where the lattice 11 is connected to the vessel wall 9 in a plurality of discrete locations, such as every location where the lattice 11 intersects the vessel wall 9. In yet other embodiments, the lattice 11 may be formed from a plurality of rods (not illustrated), where the rods are solid instead of hollow like a tube. The rods may be combined in a manner similar to the tubes 21 and hubs 31 described above with the exception that no fluid can flow within the solid rods. As can be seen, the connection of the lattice 11 to the vessel wall 9 supports the vessel wall 9 at a plurality of discrete locations, and may tie vessel walls 9 on opposite sides of a vessel together to further increase the stiffness and strength of the vessel wall 9.

Figure 5:
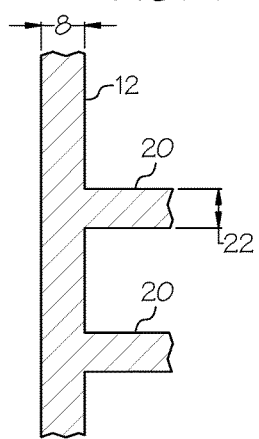
FIG. 5 is a side sectional view of a tube intersecting a vessel wall.

Reference is made to FIGS. 1 and 2 again, and also to FIG. 5. This increased stiffness and strength reduces the required thickness of the vessel wall 12 for a given pressure rating. Referring to FIG. 5, an intersection of a tube 20 and a vessel wall 12 are illustrated in cross section, where the illustration shows two opposite walls of the tube 20. The tube 20 has walls with a tube thickness 22 and the vessel wall 12 has a vessel wall thickness 8. The vessel wall thickness 8 may be from about 25 percent less than the tube thickness 22 to about 25 percent greater than the tube thickness 22 in some embodiments. In many typical embodiments without internal lattices, the vessel wall thickness 8 is significantly greater than the tube thickness 22, and may be orders of magnitude thicker. The thinner vessel wall thickness 8 described herein is possible because of the support provided by the internal lattice 10. In an exemplary embodiment, the tube thickness 22 and the vessel wall thickness 8 is from about 0.1 millimeters to about 0.6 millimeters.

Figure 6:
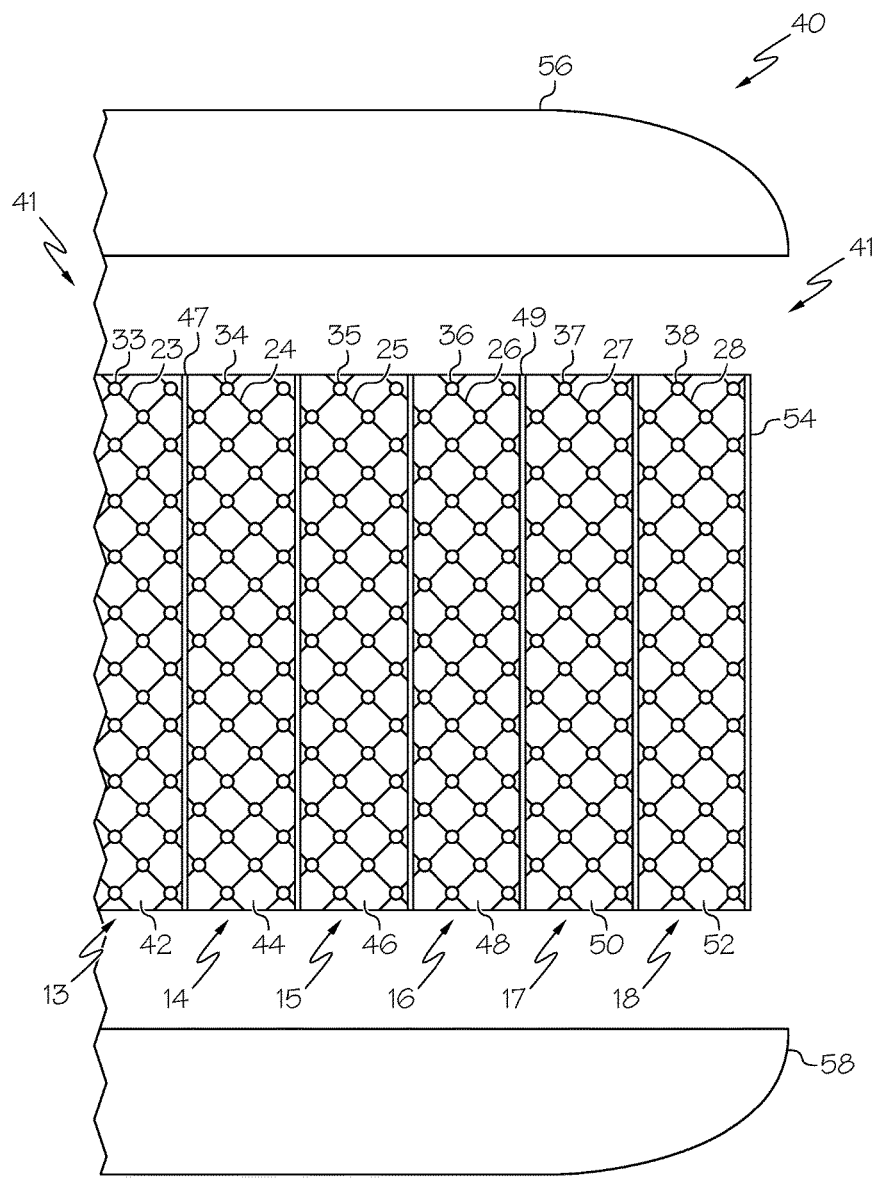
FIG. 6 is a side sectional exploded view of a portion of a hydrogen production system.

Reference is made to FIG. 6, with continuing reference to FIG. 1. The hydrogen production system 40 may include a plurality of separate chambers 41, and the number of chambers 41 may vary in different embodiments. In the illustrated embodiment, the hydrogen production system 40 includes a reformer reactor 42, a first superheater heat exchanger 44, a second superheater heat exchanger 46, a water gas shift reactor 48, a reformate cooler heat exchanger 50, and a condenser heat exchanger 52. The entire hydrogen production system 40 includes an outer wall referred to herein as an outer shell 54. The hydrogen production system 40 also includes a first header 56 and a second header 58, where the first and second headers 56, 58 are connected to the plurality of chambers 41 (reformer reactor 42, first and second superheater heat exchangers 44, 46, water gas shift reactor 48, reformate cooler heat exchanger 50, and condenser heat exchanger 52.) The first and second headers 56, 58 provide conduits to direct fluid flow between the chambers 41, as described more fully below. The first and second headers 56, 58 direct fluid flow, so the plurality of chambers 41 are in fluid communication with each other through the first and second headers 56, 58. All the chambers 41 within the hydrogen production system 40 are in fluid communication with each other where fluid may flow between the different chambers 41 through the inner flow path and/or the outer flow path of the different chambers 41. As used herein, "fluid communication" means a fluid is capable of flowing from one chamber 41 to another, where there may or may not be an intermediate chamber 41 through which the fluid flows.

In the illustrated embodiment, each of the chambers 41 (reformer reactor 42, first and second superheater heat exchangers 44, 46, water gas shift reactor 48, reformate cooler heat exchanger 50, and condenser heat exchanger 52) include a plurality of tubes 20 and hubs 30 forming a lattice 10 within. However, in alternate embodiments, one or more of the chambers 41 may not include a lattice 10, such as chambers 41 with lower operating pressures. In the illustrated embodiment, the plurality of tubes 20 and hubs 30 may be referred to by the associated chamber 41. As such, the reformer reactor 42 includes a plurality of reformer tubes 23 and reformer hubs 33 forming a reformer lattice 13, where the reformer lattice 13 is connected to a reformer reactor wall 47 at a plurality of discrete locations which may be referred to herein as a reformer plurality of discrete locations for specific identification; the first superheater heat exchanger 44 includes a plurality of first superheater HE tubes 24 and first superheater HE hubs 34 forming a first superheater HE lattice 14; the second superheater heat exchanger 46 includes a plurality of second superheater HE tubes 25 and second superheater HE hubs 35 forming a second superheater lattice 15; the water gas shift reactor 48 includes a plurality of shift tubes 26 and shift hubs 36 forming a shift lattice 16, where the shift lattice 16 is connected to the a shift reactor wall 49 at a plurality of discrete locations which may be referred to herein as a shift plurality of discrete locations for specific identification; the reformate cooler heat exchanger 50 includes a plurality of cooler tubes 27 and cooler hubs 37 forming a cooler lattice 17; and the condenser heat exchanger 52 includes a plurality of condenser tubes 28 and condenser hubs 38 forming a condenser lattice 18.

For each lattice 13, 14, 15, 16, 17, 18 there is an inner flow path and an outer flow path, where the inner flow path is within the tubes 20 and the hubs 30 and the outer flow path is outside of the tubes 20 and hubs 30. As such, the chambers 41 in the illustrated embodiment include a reformer inner flow path, a reformer outer flow path, first and second superheater HE inner flow paths, first and second superheater HE outer flow paths, a shift inner flow path, a shift outer flow path, a cooler inner flow path, a cooler outer flow path, a condenser inner flow path, and a condenser outer flow path. The first and second headers 56, 58 are configured to separately direct fluid for each chamber 41 from the inner and outer flow paths without mixing the two, so separate fluid streams can concurrently pass through each chamber 41 and remain separated within the inner and outer flow paths. (note: flow paths within the first and second headers 56, 58 are not illustrated). The lattices 10 include significant surface area from the plurality of tubes 20 and hubs 30, so there is a high rate of heat exchange between the inner and outer flow paths for an individual chamber 41 when the lattice 10 is formed from a material with a high heat transfer rate.

Figure 7:
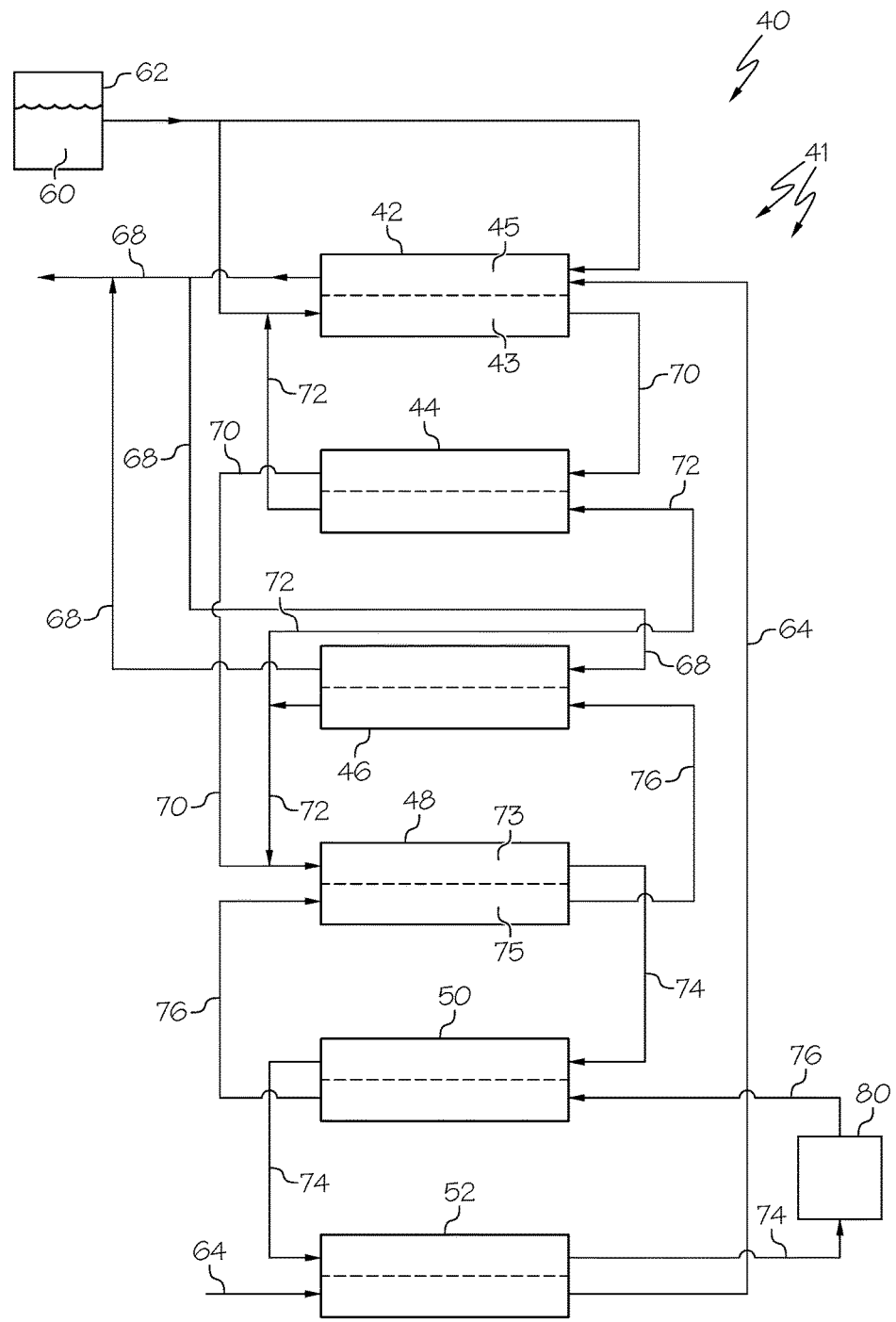
FIG. 7 schematically illustrates an exemplary embodiment of a hydrogen production system.

Reference is made to FIG. 7, which is an exemplary flow chart illustrating flow paths through the various chambers 41 illustrated in FIG. 6, with continuing reference to FIG. 1. Fuel 60 is provided from a fuel storage device 62. The fuel 60 is a hydrocarbon that may or may not include oxygen atoms, nitrogen atoms, sulfur atoms, or other types of atoms. In some embodiments the fuel is a liquid at atmospheric pressure and a temperature of about ambient, such as from about 20 to about 30° C., which is referred to herein as a "liquid fuel." The fuel 60 may be jet fuel in an exemplary embodiment, but other fuels may be used in alternate embodiments, such as gasoline, diesel fuel, ethanol, fuel oil, kerosene, etc.

The reformer reactor 42 may be divided into a reformer side 43 and a combustor side 45, where the reformer side 43 is one of the reformer inner flow path and the reformer outer flow path and the combustor side 45 is the other of the reformer inner flow path and the reformer outer flow path. Fuel 60 is provided to the reformer side 43 and to the combustor side 45, and the same fuel 60 that is provided to the reformer side 43 may be provided to the combustor side 45 in some embodiments. However, in other embodiments, different fuels 60 may be provided to the reformer side 43 and the combustor side 45. A reformer catalyst (not individually illustrated) is present in a reformer side 43 of the reformer reactor 42, and a combustion catalyst (not individually illustrated) is present in a combustor side 45 of the reformer reactor 42. The inner and outer flow paths are differentiated from each other in FIG. 7 by the dashed line passing through each chamber 41.

In an exemplary embodiment, the reformer catalyst comprises one or more of platinum, rhodium, nickel, or vanadium, but other catalysts are also possible. In the reforming reaction, a hydrocarbon fuel 60 and steam are combined and hydrogen gas, carbon monoxide, and perhaps some carbon dioxide are produced. Oxygen for the reforming reaction may be provided by air or other sources instead of, or in addition to, steam in alternate embodiments. The reforming reaction is typically proceeds at from about 700 to about 1,100° C. and a pressure of from about 3 to about 25 atmospheres, but other reaction conditions are also possible. In some embodiments, outgas from a fuel cell anode may be combined with the hydrocarbon fuel 60 in the reformer reactor 42 to recover residual hydrogen that passed through the fuel cell (not illustrated). The recovery of the hydrogen from the fuel cell anode can increase the overall efficiency of the fuel cell/hydrogen product system 40 combination by reducing waste, where the recovered hydrogen may simply flow through the hydrogen production system 40 before being returned to the fuel cell. The combustion catalyst may comprise platinum, copper, or gold, but other types of catalyst are also possible. In the combustion reaction, hydrocarbon fuel 60 is combined with oxygen to produce water and carbon dioxide, and perhaps some carbon monoxide and other combustion by-products as well. The combustion reaction typically occurs at from about 800 to about 1,500° C. and a pressure of from about 1 to about 25 atmospheres, but other reaction conditions are also possible. The catalytic combustion reaction occurs primarily at the catalyst, which may be deposited on a wall of the reformer tube 23 and/or the reformer hubs 33, so heat transfer from the catalytic combustion reaction to the reforming reaction tends to be high. The fluid flow through the reformer side 43 and the combustion side 45 of the reformer reactor 42 may be countercurrent or co-current in different embodiments, as is true for all the chambers 41.

Fuel 60 is combined with an air supply 64 and introduced to the combustor side 45, where the fuel 60 is catalytically combusted to produce heat. Fuel 60 is combined with superheated steam from a superheated steam supply 72 and introduced to reformer side 43 where the fuel 60 is reformed to produce hydrogen gas and carbon monoxide. The reforming reaction is endothermic, so heat is added to maintain a desired temperature during the reaction. Heat is produced by the combustion of fuel 60 on the combustor side 45, so heat may be added to the reformer side 43 along the entire length of the reformer reactor 42, which may reduce undesired temperature drop along the length of the reformer side 43. A combustion reaction and a reforming reaction separately occur within a single reformer reactor 42, which decreases the size and weight of the hydrogen production system 40 as a whole. The two different types of reactions are possible because the reformer reactor 42 includes reformer inner and outer flow paths, with separate and distinct reactions possible in each flow path. As such, the combined reformer reactor 42 with the reformer side 43 and the combustor side 45 can be viewed as a plurality of sets of reactors in parallel, so the temperature along the length and/or width remains relatively constant during the reforming reaction. The discharge from the combustor side 45 of the reformer reactor 42 is an exhaust 68, and the discharge from the reformer side 43 of the reformer reactor 42 is a reformate 70.

The reformate 70 is directed to a first superheater heat exchanger 44, where heat from the reformate 70 is transferred to a superheated steam supply 72. The superheated steam supply 72 is combined with the fuel 60 for the reformer side 43 of the reformer reactor 42. Some of the exhaust 68 may be discharged, but in an exemplary embodiment some or all of the exhaust 68 is directed to a second superheater heat exchanger 45 to transfer heat to the superheated steam supply 72, where the superheated steam supply 72 is heated in each of the first and second superheater heat exchangers 44, 46. The exhaust 68 may be discharged after providing heat to the superheated steam supply 72 in some embodiments.

The reformate 70 may flow to the water gas shift reactor 48 after passing through the first superheater heat exchanger 44. A portion of the superheated steam supply 72, such as from the second superheater heat exchanger 46, may be combined with the reformate 70 to pass through a shift reactor side 73 of the water gas shift reactor 48. The shift reactor side 73 is one of the shift inner flow path and the shift outer flow path, and a shift heat exchanger side 75 is the other of the shift inner flow path and the shift outer flow path. The shift reactor side 73 includes a water gas shift catalyst, which may comprise copper, cuprous oxide, iron oxide, chromium oxide, zinc oxide, aluminum oxide, other transition metal oxides, noble metal oxides, or other materials in various embodiments. The water gas shift reaction combines steam and carbon monoxide to produce hydrogen and carbon dioxide, and is typically conducted at from about 200 to about 450° C. and a pressure of from about 1 to about 20 atmospheres. The water gas shift reaction is exothermic, and produces a shift reformate 74 that has a higher hydrogen concentration than the reformate 70 entering the shift reactor side 73. Heat from the exothermic water gas shift reaction is recovered and pre-heats a water supply 76, where the water supply 76 is eventually heated to become the superheated steam supply 72. The water supply 76 may be in a liquid or gaseous state when entering the shift heat exchanger side 75, and the water supply 76 may be in the gaseous state when leaving the shift heat exchanger side 75 in some embodiments. The water supply 76 passes through the shift heat exchanger side 75 to recover heat from the water gas shift reaction.

The shift reformate 74 may be further cooled in a reformate cooler heat exchanger 50 and a condenser heat exchanger 52 before being introduced to a fuel cell 80. This cooling may condense water from the shift reformate 74, which serves to increase the hydrogen concentration in the shift reformate 74. The air supply 64 may be pre-heated in the condenser heat exchanger 52, where the shift reformate 74 and the air supply 64 each mutually exclusively pass through one of the condenser inner flow path and the condenser outer flow path of the condenser heat exchanger 52. The water supply 76 and the shift reformate 74 may each mutually exclusively pass through one of the cooler inner flow path and the cooler outer flow path of the reformate cooler heat exchanger 50.

In an exemplary embodiment, the hydrogen production system 40 is water positive, meaning more water is produced than is used, and the water may be recovered such that there is no need to provide additional water to the hydrogen production system 40 when in use. Much of the water may be provided as a by-product from the fuel cell 80, and a significant portion may also be produced in the water gas shift reactor 48. The fuel cell 80 may produce heat, and reclaimed water may be used to cool the fuel cell 80 and thereby pre-heat the reclaimed water for use in the hydrogen production system 40. Additional water is produced in the combustor side of the reformate reactor 42 and this water may be collected and re-used as well. However, cooling the exhaust 68 to condense and recover water may not be practical, so the water may be primarily provided by the fuel cell 80 and the water gas shift reactor 48 in some embodiments. There may be water reservoir (not illustrated) in one or more of the reformate cooler heat exchanger 50 and the condenser heat exchanger 52, and the water reservoir may supply some of the water for the water supply 76. As such, the hydrogen production system 40 may operate without routine and systematic addition of water.

The hydrogen production system 40 described above is one example of many different possible embodiments. In generally, chambers 41 that operate at higher temperatures are positioned closer to the center of the hydrogen production system 40, and chambers 41 that operate at lower temperatures are positioned closer to the outer shell 54, where the hydrogen production system 40 as a whole may be cylindrical in some embodiments. As such, the chambers 41 may be "nested," one within another, with heat generally flowing from the hottest chamber 41 at or near the center of the hydrogen production system 40 towards the coldest chamber 41 at or near the outer shell 54. External ambient temperatures may provide some cooling for an outermost chamber 41 through the outer shell 54 in some embodiments. In alternate embodiments, there may be more or fewer heat exchangers, and additional functional elements may be added in different chambers 41. However, alternative embodiments may include the nesting chambers, with the chamber 41 having the hottest operating temperature at or near the center, and gradually transitioning through successively cooler chambers until reaching an outmost chamber 41 bound by the outer shell 54 that has the coldest operating temperature relative to any of the other chambers 41 in the hydrogen production system 40. Possible additional functional elements that may be included in a chamber 41 of the hydrogen production system 40 or as a separate component include a peltier heat exchanger (not illustrated) to better condense water from the shift reformate 74 before entering the fuel cell 80, a sulfur removal unit to remove sulfur from the fuel 60 or from the hydrogen produced from the fuel 60, water removal units; etc. The hydrogen production system 40 may include one or more bi-metallic actuators (not illustrated) that open or close based on temperature. The bi-metallic actuators may be positioned to control flow such that operating temperatures are maintained within desired ranges, and flows are properly regulated during start-up and shut-down processes.

The lattice 10 is connected to vessel walls 12 at a plurality of discrete locations, as described above, but the production of a hydrogen production system 40 having chambers 41 with internal lattices 10 can present a machining challenge. To overcome this difficulty, additive manufacturing may be used to produce the hydrogen production system 40, and the additive manufacturing may also be used to produce the first and second headers 56, 58. Additive manufacturing, sometimes referred to as 3-D printing, involves a process where successive layers of an object are formed. For metallic parts, the feed material may be a powdered metal or a metal feed supply, such as a wire. In an exemplary embodiment with a powdered feed material, powdered metal is applied to a base and melted in desired locations. The powdered material may be melted with an energy beam, such as a laser, electron beam, or other energy beam. The melted powder is solidified to form a layer of the desired product. More powdered metal is provided and melted in desired locations to form the next layer, and the process proceeds. In a wire feed process, wire is melted and deposited in desired locations on a base or on previous layers to gradually build up a desired shape. Additive manufacturing allows for the production of complex shapes, including the lattice 10 positioned within the hydrogen production system 40, because the item is gradually built up in layers. This allows for complex internal structures that are not readily accessible for more traditional machining.

The catalysts may be deposited within the hydrogen production system 40 prior to adding the first and second headers 56, 58. The hydrogen production system 40 may include a single body that has all the chambers 41, and separate first and second headers 56, 58 that are connected to the single body. However, in alternate embodiments the hydrogen production system 40 may include a body with two or more parts, where the two or more parts may be nested as described above or may be separate parts. The various catalysts may be deposited within the desired chambers 41 by masking off undesired chambers 41 and flowing a wash coat with the catalyst through the desired location. The catalyst remains in a residual layer, and the catalyst may be fixed by an anneal or other heat treatment. The catalyst deposition technique may be repeated to obtain the desired catalyst loading. Different catalysts may be sequentially deposited, or they may be simultaneously deposited if the masking, wash coating, and heat treating processes allow.

The first and second headers 56, 58 may be attached to a main body of the hydrogen production system 40 by sonic welding, with the use of a gasket and clamps, or with other techniques. The bi-metallic actuators (not illustrated), if present, may be mechanically fastened to the first and/or second headers 56, 58 prior to assembly. In an alternate embodiment, the bi-metallic actuators may be mechanically fastened to the body at the entrance or exit of a chamber 41 prior to assembly of the body and the first and second headers 56, 58. Alternative techniques may also be used to include the bi-metallic actuators in the hydrogen production system 40. The bi-metallic actuators may include two different metals such that they actuators move with changing temperatures, where the movement serves to either open or close a passageway. The hydrogen production system 40 may also include check valves and other flow control devices in various embodiments.

The additive manufacturing process enables the production a hydrogen production system 40 that is sized and shaped for specific locations. For example, an aircraft may have a "C" shaped space with sufficient volume to accommodate a hydrogen production system with a desired capacity, so a "C" shaped hydrogen production system 40 may be produced to fit the available space. The outer shell 54 includes a concave side and a convex side for the "C" shape, and the chambers 41 are arranged within the "C" shape. Alternate embodiments include a cubic shape, a "plus sign" shape, and many other desired shapes. The lattice structure connected to vessel walls 12 at a plurality of discrete locations, as described above, enables the use of thinner containment walls for the various chambers 41. The thinner containment walls can reduce the weight and volume of the hydrogen production system 40, and the reduced weight and volume increases design options for the use of hydrogen production systems 40 and the associated fuel cells 80.

While at least one embodiment has been presented in the foregoing detailed description of the invention, it should be appreciated that a vast number of variations exist. It should also be appreciated that the embodiment or embodiments are only examples, and are not intended to limit the scope, applicability, or configuration of the invention in any way. Rather, the foregoing detailed description will provide those skilled in the art with a convenient road map for implementing an embodiment of the invention, it being understood that various changes may be made in the function and arrangement of elements described without departing from the scope as set forth in the appended claims and their legal equivalents.

What is claimed is:

1. A hydrogen production system comprising:
   a reformer reactor comprising a reformer reactor wall;
   a plurality of reformer tubes that are interconnected to define a reformer lattice with a reformer inner flow path and a reformer outer flow path, wherein the plurality of reformer tubes are within the reformer reactor, wherein the plurality of reformer tubes are connected to the reformer reactor wall at a plurality of discrete locations, wherein the reformer lattice defines a combustor side that is one of the reformer inner flow path or the reformer outer flow path, and wherein the reformer lattice defines a reformer side that is the other of the reformer inner flow path or the reformer outer flow path; and
   a reformer catalyst positioned within the reformer side.

2. The hydrogen production system of claim 1 further comprising:
   a plurality of reformer hubs positioned within the reformer reactor, wherein each of the plurality of reformer hubs are directly connected to at least three of the plurality of reformer tubes.

3. The hydrogen production system of claim 2 wherein each one of the plurality of reformer tubes directly connected to one of the plurality of reformer hubs is about 110 degrees from every other of the plurality of reformer tubes directly connected to said one of the plurality of reformer hubs.

4. The hydrogen production system of claim 2 wherein the plurality of reformer tubes and the plurality of reformer hubs form a lattice that comprises a repeating shape that about fills the reformer reactor.

5. The hydrogen production system of claim 1 further comprising:
   an air supply configured to supply air to the combustor side of the reformer reactor.

6. The hydrogen production system of claim 1 wherein:
the plurality of reformer tubes comprise a tube thickness; and
the reformer reactor wall comprises a vessel wall thickness that is from about 25 percent thinner than the tube thickness to about 25 percent thicker than the tube thickness.

7. The hydrogen production system of claim 1 further comprising:
a water gas shift reactor in fluid communication with the reformer reactor;
a first superheater heat exchanger in fluid communication with the water gas shift reactor, and wherein the first superheater heat exchanger is in fluid communication with the reformer reactor; and
an outer shell, wherein the reformer reactor, the water gas shift reactor, and the first superheater heat exchanger are within the outer shell.

8. The hydrogen production system of claim 7 further comprising:
a first header connected to the outer shell, the reformer reactor, the water gas shift reactor, and the first superheater heat exchanger; and
a second header connected to the outer shell, the reformer reactor, the water gas shift reactor, and the first superheater heat exchanger; and
wherein the first header and the second header provide fluid communication between the reformer reactor, the water gas shift reactor, and the first superheater heat exchanger.

9. The hydrogen production system of claim 8 further comprising:
a reformate cooler heat exchanger; and
a condenser heat exchanger, wherein the reformate cooler heat exchanger and the condenser heat exchanger are positioned within the outer shell.

10. The hydrogen production system of claim 7 wherein the outer shell has a concave side and a convex side such that the outer shell has a "C" shape.

11. The hydrogen production system of claim 1 further comprising a combustion catalyst within the combustor side.

12. The hydrogen production system of claim 1 wherein the combustor side and the reformer side are configured for counter current flow.

13. The hydrogen production system of claim 1 wherein the hydrogen production system is configured to provide a superheated steam to the reformer side.

14. A hydrogen production system comprising:
a water gas shift reactor comprising a shift reactor wall;
a plurality of shift tubes that are interconnected to define a shift inner flow path and a shift outer flow path, wherein the plurality of shift tubes are within the water gas shift reactor, and wherein the plurality of shift tubes are connected to the shift reactor wall at a shift plurality of discrete locations; and
a first header and a second header that are configured to supply a reformate to a shift reactor side of the water gas shift reactor, wherein the shift reactor side is one of the shift inner flow path or the shift outer flow path, and wherein the first header and the second header are further configured to supply water to a shift heat exchanger side of the water gas shift reactor, wherein the shift heat exchanger side is the opposite one of the shift inner flow path and the shift outer flow path as that of the shift reactor side.

15. The hydrogen production system of claim 14 further comprising:
a reformer reactor;
a first superheater heat exchanger; and
an outer shell, wherein the water gas shift reactor, the reformer reactor, and the first superheater heat exchanger are positioned within the outer shell, and wherein the water gas shift reactor, the first superheater heat exchanger, and the reformer reactor are in fluid communication.

16. The hydrogen production system of claim 15 further comprising:
a plurality of reformer tubes within the reformer reactor; and
a plurality of reformer hubs, wherein at least three of the reformer tubes are directly connected to each of the plurality of reformer hubs, wherein the plurality of reformer tubes and the plurality of reformer hubs form a reformer lattice, and wherein the reformer lattice is connected to a reformer reactor wall at a reformer plurality of discrete locations.

17. The hydrogen production system of claim 14 further comprising:
a plurality of chambers, wherein the water gas shift reactor comprises one of the plurality of chambers;
an outer shell, wherein the plurality of chambers are positioned within the outer shell; and
a plurality of tubes and a plurality of hubs defining a plurality of lattices, where one of the plurality of lattices is within each of the plurality of chambers, and wherein the one of the plurality of lattices is connected to a vessel wall at a plurality of discrete locations within the one of the plurality of chambers that the one of the plurality of lattices is within.

18. The hydrogen production system of claim 17 wherein:
the plurality of shift tubes have a tube thickness; and wherein
the shift reactor wall has a vessel wall thickness that is from about 25 percent less than the tube thickness to about 25 percent greater than the tube thickness.

19. The hydrogen production system of claim 18 wherein the tube thickness is from about 0.02 millimeters to about 0.6 millimeters.

20. A method of producing hydrogen gas, the method comprising the steps of:
producing the hydrogen gas from a liquid fuel in a reformer side of a reformer reactor, wherein the reformer side is defined as one of a reformer inner flow path or a reformer outer flow path, wherein the reformer inner flow path and the reformer outer flow path are defined by a plurality of reformer tubes positioned within the reformer reactor, wherein the plurality of reformer tubes are interconnected to form a lattice, and wherein the plurality of reformer tubes are connected to a reformer reactor wall at a plurality of discrete locations; and
combusting the liquid fuel in a combustor side of the reformer reactor, wherein the combustor side is the opposite of the reformer inner flow path and the reformer outer flow path as that of the reformer side.

\* \* \* \* \*